US 010794758B2

(12) United States Patent
Albagli et al.

(10) Patent No.: US 10,794,758 B2
(45) Date of Patent: Oct. 6, 2020

(54) SYSTEM AND METHOD FOR VERIFYING THE INTEGRITY OF A RADIATION DETECTOR

(71) Applicant: GENERAL ELECTRIC COMPANY, Schenectady, NY (US)

(72) Inventors: Douglas Albagli, Clifton Park, NY (US); Nicholas Konkle, Sussex, WI (US); Joseph Kulak, Franklin, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 487 days.

(21) Appl. No.: 15/720,519

(22) Filed: Sep. 29, 2017

(65) Prior Publication Data

US 2019/0101439 A1    Apr. 4, 2019

(51) Int. Cl.
| | | |
|---|---|---|
| G01J 1/18 | (2006.01) | |
| G01T 1/17 | (2006.01) | |
| G01T 1/24 | (2006.01) | |
| G01T 7/00 | (2006.01) | |

(52) U.S. Cl.
CPC .............. *G01J 1/18* (2013.01); *G01T 1/17* (2013.01); *G01T 1/244* (2013.01); *G01T 7/005* (2013.01)

(58) Field of Classification Search
CPC ....... A61B 6/4233; A61B 6/505; A61B 6/482; A61B 6/5258; A61B 6/5217; A61B 6/5205; A61B 6/4216; A61B 6/582; A61B 6/00; H04N 5/3597; H04N 5/361; H04N 5/32; G01T 1/208; G01T 1/2012
See application file for complete search history.

(56) References Cited

U.S. PATENT DOCUMENTS

| | | | |
|---|---|---|---|
| 6,031,234 A | 2/2000 | Albagli et al. | |
| 6,693,668 B1 | 2/2004 | May | |
| 7,495,228 B1* | 2/2009 | Albagli | ............ H01L 27/14663 |
| | | | 250/370.09 |
| 2005/0231656 A1* | 10/2005 | den Boer | ............ H01L 31/0224 |
| | | | 349/42 |

FOREIGN PATENT DOCUMENTS

| | | |
|---|---|---|
| EP | 1229481 A2 | 8/2002 |
| GB | 2328014 A | 2/1999 |
| JP | 2003259238 A | 9/2003 |
| JP | 2011133454 A | 7/2011 |

OTHER PUBLICATIONS

EP Patent Application No. 18195761.4 Extended Search Report dated Feb. 28, 2019, 10 pages.

* cited by examiner

*Primary Examiner* — David P Porta
*Assistant Examiner* — Meenakshi S Sahu
(74) *Attorney, Agent, or Firm* — Fletcher Yoder, P.C.

(57) ABSTRACT

A system for verifying the integrity of a radiation detector is provided. the system includes one or more data modules, one or more data lines, and a controller. The one or more data lines electronically connect one or more detector elements of the radiation detector to the one or more data modules. Each of the detector elements is operative to detect electromagnetic radiation. The controller is operative to induce a voltage in the one or more detector elements, obtain a reading from the one or more detector elements via the one or more data modules; and determine whether the integrity of the radiation detector has been compromised based at least in part on comparing the reading to a benchmark.

20 Claims, 5 Drawing Sheets

SYSTEM AND METHOD FOR VERIFYING THE INTEGRITY OF A RADIATION DETECTOR

BACKGROUND

Technical Field

Embodiments of the invention relate generally to medical imaging systems, and more specifically, to a system and method for verifying the integrity of a radiation detector.

Discussion of Art

The radiation detectors of many radiation based imaging systems, e.g., x-ray imaging systems, typically include thin film semiconductor imaging arrays having a photosensor array coupled to a scintillating medium. Radiation absorbed by the scintillator generates optical photons which in turn pass into a photosensor, such as a photodiode. The optical photon is absorbed in the photosensor and an electrical charge corresponding to an incident photon flux is generated. Substantially hydrogenated amorphous silicon ($\alpha$-Si) is commonly used in the fabrication of photosensors due to the advantageous photoelectric characteristics of $\alpha$-Si and the relative ease of fabricating such devices, especially for large area format devices. In particular, photosensitive elements, such as photodiodes, can be formed in connection with necessary control or switching elements, such as bottom-gated thin film transistors ("TFTs"), in a relatively large array.

Such radiation detectors are typically fabricated on a large substrate on which may components, including the TFTs, address lines, e.g., data and scan lines, capacitors, and photosensors are formed through the sequential deposition and patterning of layers of conductive, semiconductive, and insulative materials. Such substrates, however, may develop cracks when dropped, bumped, and/or otherwise subjected to high acceleration forces, which in turn, may compromise the integrity of the encompassing radiation detector, e.g., damage the address lines, photosensors, TFT's and/or other detector components.

Accordingly, many radiation detectors often include an accelerometer that, upon experiencing an excessive acceleration force, triggers a signal indicative to an operator that one or more components of the radiation detector may be damaged. Such accelerometers, however, often suffer from false positives and/or false negatives. For example, the components of a radiation detector do not always break when subjected to excessive acceleration forces, and/or may break for reasons which may be undetectable via an accelerometer.

What is needed, therefore, is an improved system and method for verifying the integrity of a radiation detector.

BRIEF DESCRIPTION

In an embodiment, a system for verifying the integrity of a radiation detector is provided. the system includes one or more data modules, one or more data lines, and a controller. The one or more data lines electronically connect one or more detector elements of the radiation detector to the one or more data modules. Each of the detector elements is operative to detect electromagnetic radiation. The controller is operative to induce a voltage in the one or more detector elements, obtain a reading from the one or more detector elements via the one or more data modules; and determine whether the integrity of the radiation detector has been compromised based at least in part on comparing the reading to a benchmark.

In another embodiment, a method for verifying the integrity of a radiation detector is provided. The method includes inducing a voltage in one or more detector elements of the radiation detector, each of the detector elements operative to detect electromagnetic radiation. The method further includes obtaining a reading from the one or more detector elements, and determining whether the integrity of the radiation detector has been compromised based at least in part on comparing the reading to a benchmark.

In yet another embodiment, a non-transitory computer readable medium storing instructions is provided. The stored instructions are configured to adapt a controller to induce a voltage in one or more detector elements of a radiation detector, obtain a reading from the one or more detector elements via one or more data modules electrically connected to the one or more detector elements via one or more data lines, and determine whether the integrity of the radiation detector has been compromised based at least in part on comparing the reading to a benchmark.

DRAWINGS

The present invention will be better understood from reading the following description of non-limiting embodiments, with reference to the attached drawings, wherein below:

DETAILED DESCRIPTION

Figure 1:
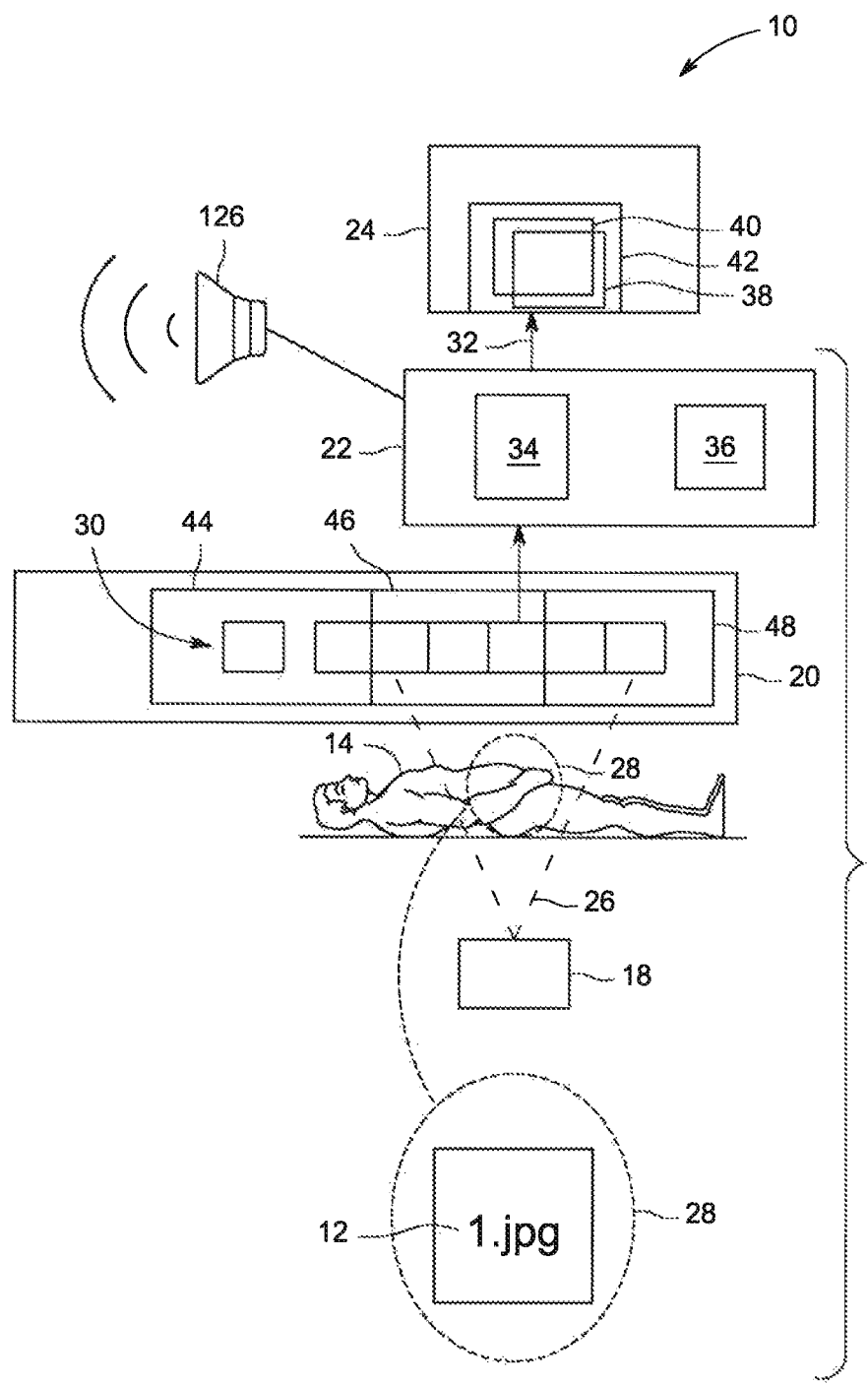
FIG. 1 is a block diagram of an imaging system having a radiation detector that includes a system for verifying the integrity of the radiation detector, in accordance with an embodiment of the present invention.

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As used herein, "electrically coupled," "electrically connected," and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present. The term "real-time," as used herein, means a level of processing responsiveness that a user senses as sufficiently immediate or that enables the processor to keep up with an external process. As further used herein, the terms "imaging procedure" and/or "medical imaging procedure" refer to a medical procedure that involves an imaging system to assist in accomplishing one or more tasks. Accordingly, as also used herein, the term "task" means an objective of a medical procedure, e.g., obtaining a biopsy, deploying/installing a stent into a blood vessel, locating an ulcer, imaging a clogged artery, suturing a patient, and/or other medical processes. The term "integrity," as used herein with respect to a radiation detector, refers to a level of assurance that the radiation detector is functioning, and/or will function, as intended. For example, a radiation detector having an uncompromised integrity may be relied upon as having a very high likelihood of functioning as intended, whereas a radiation detector having a compromised integrity has a low and/or unknown likelihood of functioning as intended.

Additionally, while the embodiments disclosed herein are described with respect to an x-ray based imaging system, it is to be understood that embodiments of the present invention are equally applicable to other devices, such as Positron Emission Tomography ("PET"), and/or any other type of imaging system that utilizes electromagnetic radiation detectors. As will be appreciated, embodiments of the present invention related imaging systems may be used to analyze objects within any material which can be internally imaged, generally. As such, embodiments of the present invention are not limited to analyzing objects within human tissue.

Referring now to FIG. 1, a medical imaging system 10 in accordance with an embodiment of the present invention is shown. As will be understood, the system 10 is operative to image a structure 12, e.g., an internal organ, blood vessel, etc., within a the subject/patient 14. For example, the patient 14 may be undergoing a stent implant medical procedure, and the imaged structure 12 may be a coronary artery. As shown in FIG. 1, the imaging system 10 includes: a radiation source 18 and a radiation detector 20, which collectively form an imaging device; a controller 22; and a display screen 24. The radiation source 18 projects a radiation beam 26 through a region of interest ("ROI") 28 of the patient 14 within which the structure 12 is disposed. The radiation beam 26 is received by the radiation detector 20, which generates a plurality of images 30 that are then communicated to the controller 22, which generates a video feed 32 that is transmitted to and displayed by the display screen 24. As will be appreciated, in embodiments, the radiation detector 20 and/or radiation source 18 may be mobile units, e.g., part of a mobile x-ray system for imaging a patient 14 while minimizing movement 14 of the patient. The radiation beam 26 may include various types of electromagnetic radiation, to include ionizing electromagnetic radiation such as x-rays and/or gamma rays.

As further shown in FIG. 1, the controller 22 includes at least one processor/CPU 34 and at least one memory device 36, and is in electronic communication with the radiation source 18, detector 20, and/or the display screen 24. An imaging program/application may be stored in the at least one memory device 36 that, when loaded into the at least one processor 34, adapts the controller 22 to generate the video feed 32 by processing the images 30 received from the detector 20. In embodiments, the imaging program may further adapt the controller 22 to control the detector 20 and/or the radiation source 18.

The video feed 32 includes a plurality of frames 38, 40, and 42. As used herein, the term frame describes a composite image that may be based at least in part on one or more of the plurality of images 30 acquired by the imaging system 10. For instance, in embodiments, a single composite image/frame 42 may be generated by registering one or more of the acquired images 30 to a reference image selected from the plurality of images 30. The registration of one or more images 30 to a reference image may increase the contrast of the structure 14 within the produced/generated frame 42. Accordingly, in embodiments, each frame 38, 40, and 42 may be based at least in part on one or more of the images 30 received by the controller 22 from the detector 20. Once a frame 42 has been generated, it is transmitted, as part of the video feed 32, by the controller 22 to the display screen 24. In other words, in embodiments, the displayed video feed 32 is a processed form of the raw images 30 acquired by the imaging system 10. In embodiments, the video feed 32 may be a live/real-time and/or near-real-time feed. In other embodiments, one or more of the frames 38, 40, and 42 may be still images, e.g., a photograph.

Figure 2:
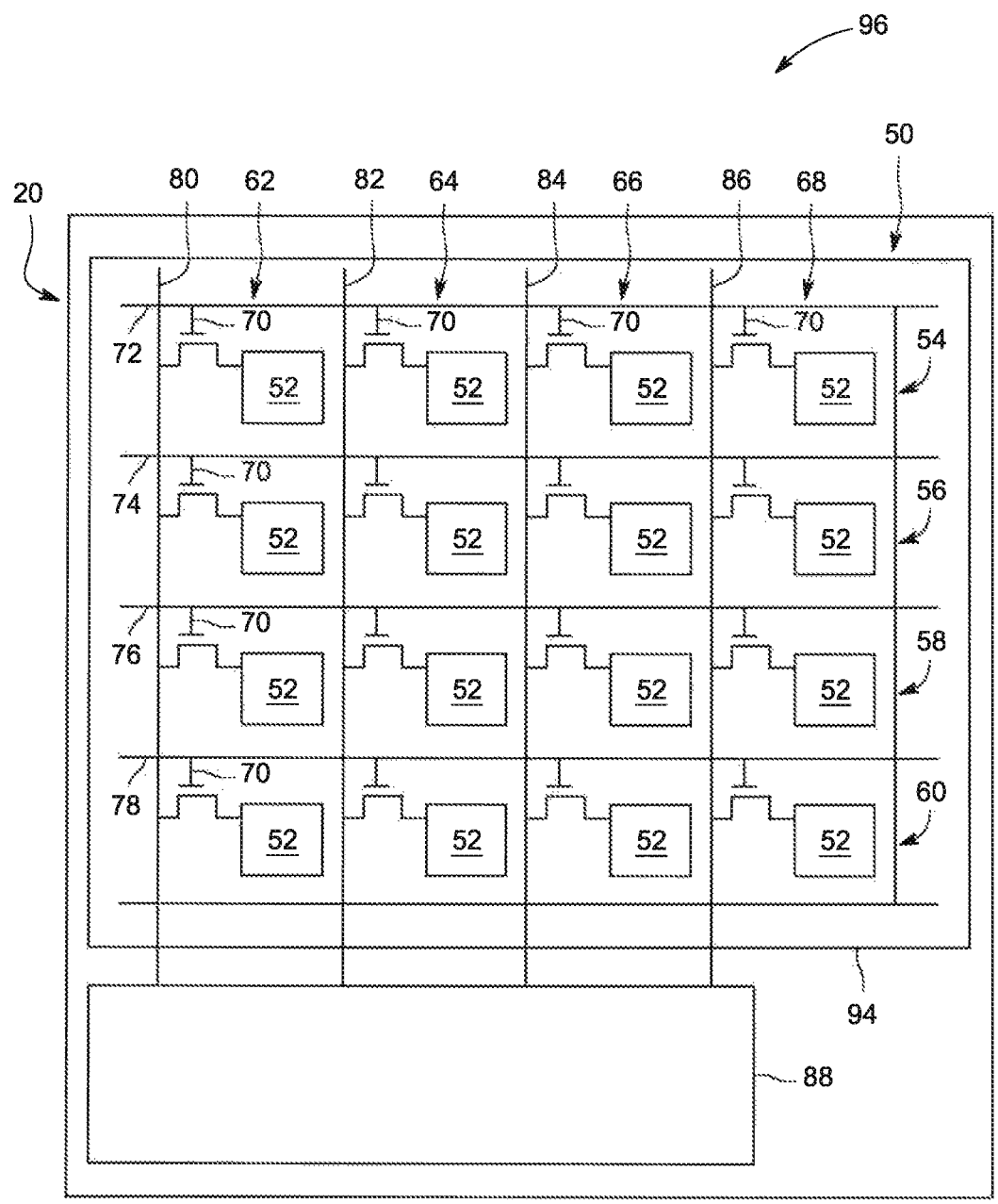
FIG. 2 is a diagram of the system for verifying the integrity of the radiation detector of FIG. 1, in accordance with an embodiment of the present invention.

Moving to FIG. 2, the radiation detector 20 may include a detector array 50, e.g., a photosensor array, having a plurality of detector elements 52, e.g., photosensors/photodiodes, disposed in one or more rows 54, 56, 58, 60 and/or one or more columns 62, 64, 66, 68. The detector array 50 is optically coupled to a scintillator, which, while omitted from the drawings for the purpose of improving clarity, is to be understood as being disposed over the detector array 50. During operation of the imaging system 10, according to an embodiment, the detector 20 is positioned so that the radiation beam 26 (FIG. 1) is incident on and absorbed by the scintillator, which in turn generates photons that are detected by detectors elements 52. Thus, detection by the detector elements 52 of the photons generated by the scintillator provides for the generation of electrical signals corresponding to the pattern of the radiation beam 26 incident on the scintillator.

As further shown in FIG. 2, each of the detector elements 52 is electrically coupled by a corresponding switching device 70, e.g., a TFT or field effect transistor ("FET"), to a corresponding scan line 72, 74, 76, 78 and a corresponding data line 80, 82, 84, 86 such that an electrical signal applied to a particular scan line, e.g., 72, causes the switches 70 coupled to the detector elements 52 along the corresponding row, e.g., 54, to become conductive. Thus, one or more data modules 88 (and 90 in FIG. 5) may obtain one or more readings 92 (FIG. 3) of the signals from the detector elements 52 of the corresponding row 54 via the data lines 80, 82, 84, 86. In other words, activation of a particular scan line 72 allows the data modules 88, 90 to read, via the data lines 80, 82, 84, 86, the value of all of the detector elements 52 electronically connected to the scan line 72. Accordingly, in embodiments, the data model 88 may read, via the data lines 80, 82, 84, 86, all of the detector elements 52 in the array 50 row by row by sequentially activating a particular scan line while deactivating the remaining scan lines.

For example, as illustrated in FIG. 2, activating scan line 72, while deactivating scan lines 74, 76, and 78, allows the data module 88 to read the signals from all of the detector elements 52 along row 54. Similarly, activating scan line 74, while deactivating scan lines 72, 76, and 78, allows the data module 88 to read all of the detector elements 52 along row 56. The remaining scan lines 76 and 78 can be read by the data module 88 in a similar manner. In certain aspects, a common line 94 electronically connects each of the detector elements 52 to one another, e.g., the common line 94 may be a conductive layer disposed adjacent to the detector elements 52 and/or wires, which may be used to set a common bias voltage across the detector elements 52. As will be appreciated, the data module 88 may store the readings 92 (FIG. 3) of the detector elements 52 in the system memory 36 (FIG. 1) as analogue and/or digital values that may be accessed by the controller 22 (FIG. 1) for the purpose of generating the images 30 as described above.

As also stated above, however, excessive acceleration forces and/or other events, may cause cracks to appear within the materials used to form/print the detector elements 52, switches 80, scan lines 72, 74, 76, 78, data lines 80, 82, 84, 86, common line 94, and/or other components of the radiation detector 20.

Figure 3:
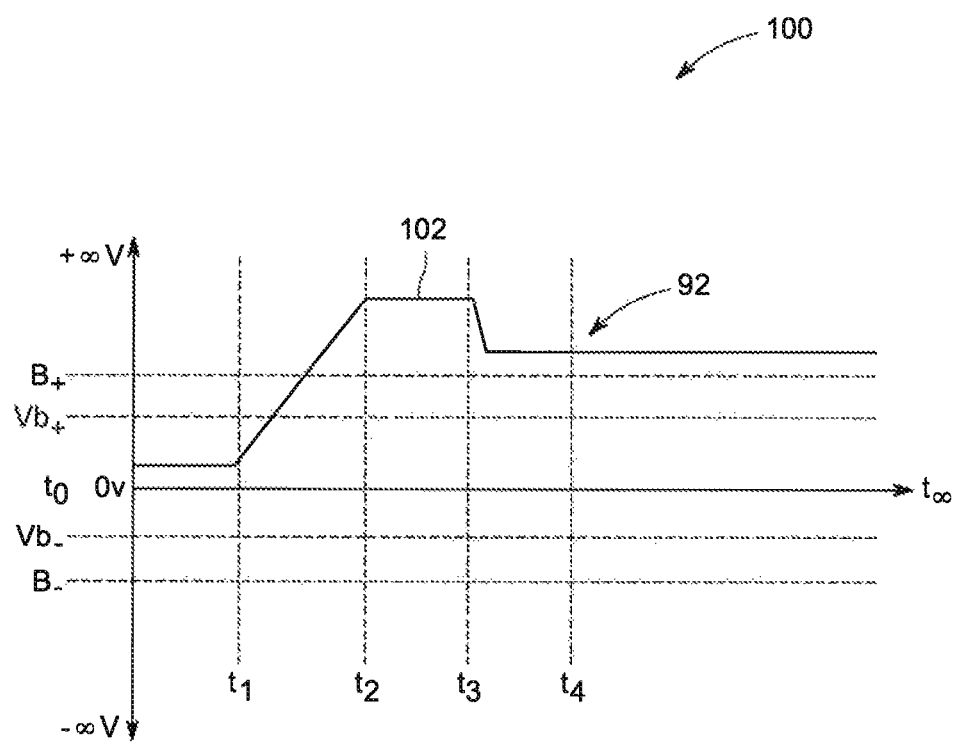
FIG. 3 is a graph depicting a voltage in a detector element of the system of FIG. 2 over time, in accordance with an embodiment of the present invention.

Accordingly, further shown in FIG. 2 is a system 96 for verifying the integrity of the radiation detector 20 which, in embodiments, may include the one or more data modules 88 and/or 90 (FIG. 5), the one or more data lines 80, 82, 84, 86, the one or more detector elements 52, and the controller 22 (FIG. 1). In embodiments, the system 96 may further include the one or more scan lines 72, 74, 76, 78, switches 70, and/or common line 94. As will be explained in greater detail below, the controller 22 is operative to induce/generate a voltage in the one or more detector elements 52, obtain a reading from the detector elements 52 via the data modules 88, 90, and determine if the integrity of the radiation detector 20 has been compromised based at least in part on comparing the readings 92 to a benchmark B+ and/or B− (FIG. 3). As will be appreciated, in embodiments, inducing a voltage in the detector elements 52 simulates a detected photon, and reading out the detector elements 52 via the data modules 88 and/or 90 serves to verify that there are no breaks in the data lines 80, 82, 84, 86 and/or that the detector elements 52 are functioning correctly. The controller 22 may induce the charge via the common line 94, and/or via the scan lines 72, 74, 76, 78, data lines, 80, 82, 84, 86, and/or other electrical connections capable of inducing a charge in the detector elements 52.

For example, turning to FIG. 3, a graph 100 displaying the voltage V (represented by line 102) in a detector element 52 (FIG. 2) over time t is shown. As will be appreciated, due to electric noise and/or other factors, the detector elements 52 may have an initial base charge/voltage level between an upper base voltage threshold Vb+ and a lower base voltage threshold Vb− as shown by the portion of line 102 between to and $t_1$. The controller 22 (FIG. 1) may then execute a test of the detector element 52 by inducing a voltage from $t_1$ to $t_2$, subsequently draining/de-energizing the voltage 102 from the detector element 52 at $t_3$, and obtain a reading at $t_4$. Draining/de-energizing of the detector element 52 may be accomplished by activating the appropriate scan line 72, 74, 76, 78 (FIG. 2) so that the voltage 102 drains/flows to the data modules 88 (FIG. 2) and/or 90 (FIG. 5), and then deactivating the scan lines 72, 74, 76, 78.

As shown by the line 102 between $t_3$ and $t_4$, a residual voltage remains/re-stabilizes after de-energizing within a properly functioning detector element 52, which in turn, may be read by the data modules 88, 90 via reactivating the same scan line 72, 74, 76, 78 so that the residual voltage 102 flows into the data modules 88, 90 via the data lines 80, 82, 84, 86 as shown by the line 102 at $t_4$. In other words, the controller 22 obtains a reading 92 of the voltage 102 within a detector element 52 via the data modules 88, 90 after having charged and drained/de-energized the detector element 52. Upon reading the detector element 52 via the data modules 88, 90 the controller 22, in embodiments, may then compare the reading 92 to the benchmark B+ to determine if the detector element 52 and/or data lines 80, 82, 84, 86 are functioning properly.

For example, in embodiments, the benchmark B+ may correspond to a voltage level/threshold beyond the upper base voltage threshold Vb+, i.e., beyond the expected base voltage level. In such embodiments, the controller 22 may determine that the detector element 52 and/or the corresponding data line 80, 82, 84, 86 is functioning correctly or incorrectly if the reading 92 exceeds or fails to exceed the benchmark B+, respectively. While the preceding example described a test of a detector element 52 and corresponding data line 80, 82, 84, 86 by inducing a positive voltage with a positive base voltage threshold Vb+ and a positive benchmark B+, it will be understood that a similar test may be performed utilizing negative induced voltages with a negative base voltage threshold Vb− and a negative benchmark B− wherein the controller 22 may determine that the detector element 52 and/or the corresponding data line 80, 82, 84, 86 is functioning correctly or incorrectly, respectively, if the reading 92 exceeds or fails to exceed the benchmark B−. As will be further appreciated, in embodiments, a reading 92 of zero (0) and/or near zero (0) volts, regardless of the direction of the induced voltage, indicates that the detector element 52 and/or the corresponding data line 80, 82, 84, 86 is functioning incorrectly.

If enough detector elements 52 and/or data lines 80, 82, 84, 86 are functioning incorrectly, the controller 22 may then determine that the integrity of the radiation detector 22 has been compromised. The number of incorrectly functioning detector elements 52 and/or data lines 80, 82, 84, 86 sufficient for the controller 22 to deem the integrity of the radiation detector 20 as compromised may be dependent on the operational tolerance of a particular medical imaging procedures and may range from a single detector element 52 and/or data line 80, 82, 84, 86 to all of the detecting elements 52 and/or data lines 80, 82, 84, 86 forming the array 50.

As will be understood, embodiments of the invention may employ variations of the above-described methods of inducing a charge in the detector elements 52 and subsequently reading the detector elements 52. For example, in embodiments, there may be two types of signals measured by the controller, namely, an "x-ray signal", i.e., the component of the voltage measured by the data modules 88 and/or 90 due to energy imparted into the detector elements 52 from an x-ray strike, and an "offset signal", i.e., the voltage level that appears within the detector elements 52 even in the absence of x-ray strikes. Thus, in certain aspects, the controller 22 may be operative to sample the detector elements 52 in a manner that compensates for, e.g., removes, the offset signal.

For example, the controller 22 may obtain a first reading of the detector elements 52 referred to herein as an "offset image" and/or an "offset reading", which includes just the offset signal; and a second reading of the detector elements 52, referred to herein as a "composite image", a "composite signal", and/or a "composite reading", which includes the offset signal and the x-ray signal. Thus, a third reading, referred to herein as the "corrected image", the "corrected signal", and/or the "corrected reading", may be obtained by subtracting the offset image from the composite image. In other words, the controller 22 may be configured to subtract the offset signal from the composite signal in order to obtain the x-ray signal.

Thus, in embodiments, the data modules 88 and/or 90 may include a double sampling amplifier, and the controller 22 may be operative to read the detector elements 52 in a scan line, e.g., 72, by: measuring a first voltage on each of the data lines 80, 82, 84, 86; waiting for a period of time, referred to herein as the "first settle time"; energizing the scan line 72 from about −10V to about +10V; waiting for another period of time, referred to herein as the "'FET-ON' time"; de-energizing the scan line 72 from about +10V back to about −10V; waiting another period of time, referred to herein as the "second settle time", and then measuring a second voltage on each of the data lines 80, 82, 84, 86. As will be further understood, the total amount of time for obtaining the first and second voltage measurements is referred to herein as the "line time," which in embodiments, may be equal to the sum of the first settle time, the FET-ON time, and the second settle time. In embodiments, the transistors 70 of the detector elements 52 may be conductive during the FET-ON time such that any charge within the transistors 70 flows to the data lines 80, 82, 84, 86 and into the dual amplifiers in the data modules 88 and/or 90. In embodiments, the corrected signal of a particular detector element 52 may be calculated by subtracting the measured first voltage of the detector element 52 from the measured second voltage of the same detector element 52.

As will be further understood, however, in such embodiments the offset image/signal may be formed from three separate components, two of which may be positive and one which may be negative, which result in a net signal that may have a slightly positive, slightly negative, or zero (0) value. For example, energizing a scan line 72, at the beginning of the FET-ON time, may result in large charges flowing into the transistors 70 of the detector elements 52 connected to the scan line 72 such that charges become trapped. Upon de-energizing the scan line 72, after the FET-ON time, most of the trapped charges subsequently flows back out of the transistors 70 via the data lines 80, 82, 84, or 86.

As will be appreciated, however, due to charge retention of the transistors 70 corresponding to the detector element 52, a small amount of charge, referred to herein as "retained charge", remains within the transistors 70, which may contribute to the negative component of the offset image/signal.

For example, while such retained charges eventually leak out of the transistors 70 and back to the data lines 80, 82, 84, and/or 86 so as to form a "compensation current", it may take several line times for the retained charges to fully leave/completely leak out of the transistors 70. As such, the negative component of the offset signal on a particular data line 80 may be due to the charge retention from a particular transistor 70 on the data line 80 resulting from a particular FET-ON time, i.e., the reading of a particular scan line 72, and one of the positive components of the offset signal may be due to the retained charges emptying from the traps of one or more of the other transistors 70 on the same data line 80 due to previous FET-ON times, i.e., one or more previous readings of the other scan lines 74, 76, and/or 78. The other positive component of the offset signal may be due to voltage/charge building up on the capacitance of the detector elements 52/photodiodes on the same data line 80 while the corresponding switches 70 are non-conductive, i.e., "turned-off." As will be appreciated, the built up charge may then flow out of the detector elements 52/photodiodes and onto the data line 80 when the switches 70 are conductive, i.e. "turned-on", e.g., during the corresponding FET-ON times.

Thus, in embodiments, the offset signal for a detector element 52, as read by the data modules 88 and/or 90 via the data lines 80, 82, 84, 86, may be the sum of: the negative component due to charge retention from a particular transistor 70 on a data line 80; the positive component due to the charge retention leaking out of the traps on the other transistors 70 on the same data line 80, 82, 84, 86 from previous scan line reads, and the positive component due to voltage/charge leaking out of/from the detector element 52 corresponding to the particular transistor 70. Depending on the values of the negative and two positive components of the offset signal on a particular data line 80, 82, 84, 86, it may be difficult to determine if the data line 80, 82, 84, 86 has a value of zero (0) volts, i.e., whether the data line 80, 82, 84, 86 is broken.

Accordingly, in embodiments, the second voltage sample/sampling, from the above-described read-out process, may be moved from after the second settle time to just before the end of the FET-ON time. As will be appreciated, moving the second sample in such a manner may generate a large negative offset due to the second sample occurring before de-energization of the transistor 70 and/or corresponding detector module 52 such that a large charge may still be still trapped in the same transistor 70 and/or detector element 52. Thus, in such embodiments, the offset signal/image will be shifted away from zero (0) towards a negative value such that a cracked/broken data line, e.g., 80, will register as a zero (0), and/or near zero (0), charge on the data line 80.

Figure 4:
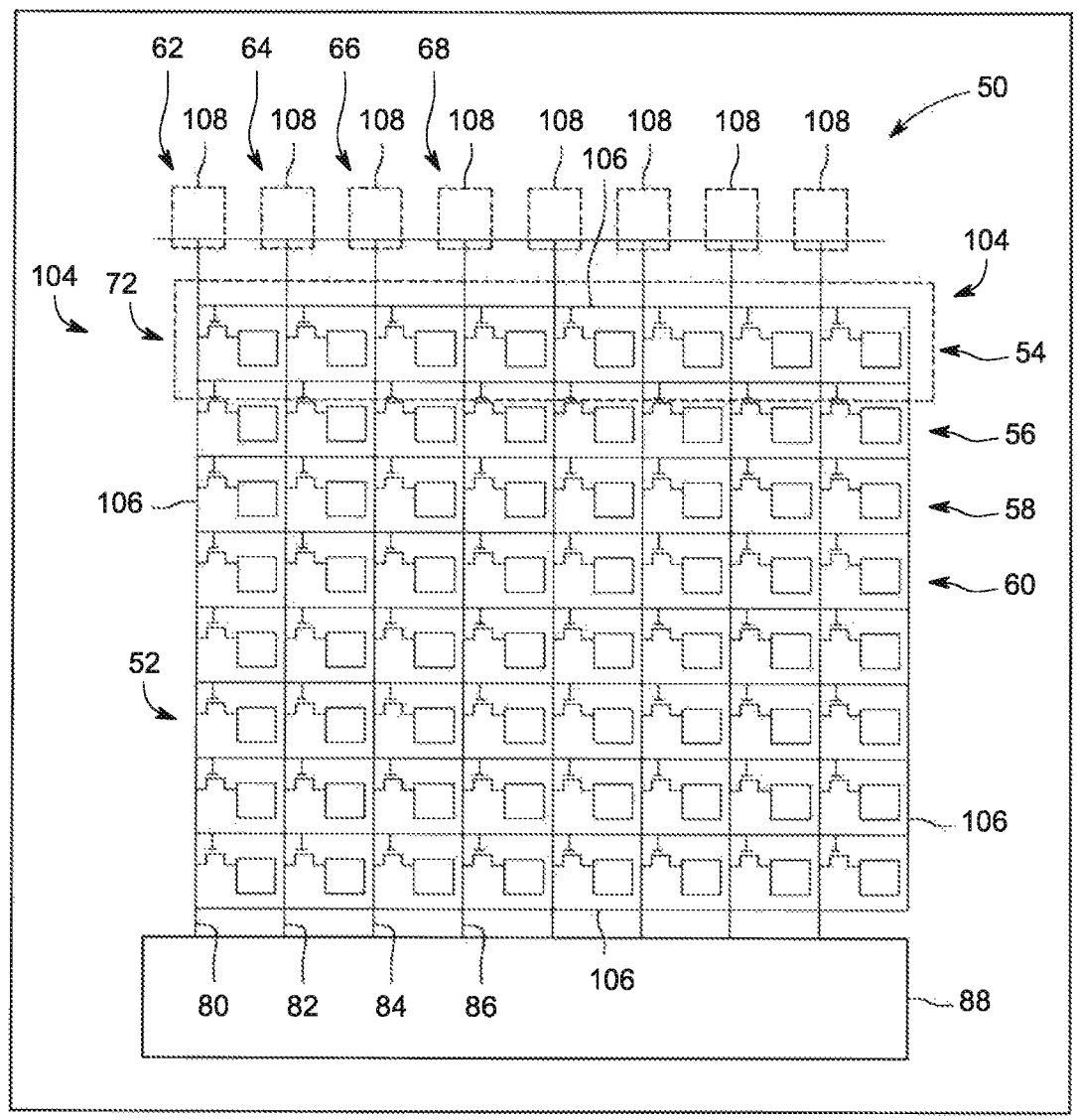
FIG. 4 is a diagram of another embodiment of the system of FIG. 2 having simulated detector elements, in accordance with an embodiment of the present invention.

Turning now to FIG. 4, in embodiments, the detector elements 52 and/or the data lines 80, 82, 84, 86 tested by the controller 22, in the manner described above, may be disposed in a peripheral zone (represented by the dashed box 104) of the array 50. As used herein with respect to the array 50, the term "peripheral zone" refers to the rows and/or columns disposed along the edge 106 of the array 50. The width of the peripheral zone 104, i.e., the number of adjacent detector elements 52 from the edge 106 of the array 50, may vary. For example, in embodiments, the peripheral zone 104 may have a width of one (1) detector element 52, while in other embodiments, the peripheral zone 104 may have a width of two or more detector elements 52. In embodiments wherein all of the detecting elements 52 in a column 62, 64, 66, 68 are connected to the same data line 80, 82, 84, 86, testing of the detector elements 52 in the peripheral zone 104, which may be on the side of the array 50 opposite the side which the data lines 80, 82, 84, 86 connect into a data module 88, provides for verification of the functioning of the data lines 80, 82, 84, 86 from the tested detector element 52 to the data module 88. In other words, testing of the detector module 52 in a particular column disposed the farthest away from a connected data module 88 on the same corresponding data line 80, 82, 84, 86 verifies that there are no breaks in the data line 80, 82, 84, 86 along the entire corresponding column 62, 64, 66, 68.

For example, the detector elements 52 in one or more rows 54, 56, 58, 60, e.g., four (4) extending from the edge 106 through the peripheral zone 104 may be electronically connected to the scan line 72 closest to the edge 106, while the remaining detector elements 52 of the other scan lines are not connected to their corresponding scan lines. Thus, a reading of the first scan line 72 constitutes a summing of the offset signal across the connected rows 54, 56, 58, and 60, while individual readings of the rows 56, 58, and 60 constitute sampling of the voltage/charge on the data lines 80, 82, 84, 86 not due to any detector element 52. Thus, the signals from the individual readings of rows 56, 58, and/or 60 will be positive due to the charge compensating current from the switches 70 corresponding to rows 54, 56, 58, and 60, while no photodiodes/detector elements 52 contribute to the sampled signals, nor any FETs/switches 70 turned on.

In embodiments, the controller 22 may pulse the common line 94 just before read-out of the detector elements 52 in the scan lines, e.g., 72, falling within the peripheral zone 104. In such embodiments, the component of the offset signal/image corresponding to the photodiode leakage may be measured with respect to the common line 94, i.e., the common electrode of the photodiode/detector 52. Thus, by changing the value of the voltage induced via the common line 94 by a positive or a negative amount, e.g., +1V or −1V, between successive readings/samples of the data lines 80, 82, 84, 86, the offset signal may be shifted in a positive or negative direction, respectively, which provides for a broken/cracked data line 80, 82, 84, 86 to register, i.e., to be sampled by the data modules 88 and/or 90, as a zero (0), and/or near zero (0), voltage. In embodiments, the common line 94 may be configured such that it may induce a voltage in the detector elements 52 without modulating the other components of the detector 20.

In certain aspects, the tested detector elements may be simulated detector elements, as represented by dashed boxes 108, that form a "zero column" and/or a "zero row," i.e., a column and/or row that is disposed beyond the edge 106 of the array. As will be appreciated, the simulated detector elements 108 may be simple switchable electrical connections which, while not necessary operative to detect photons, are capable of inducing charges in the data lines 80, 82, 84, 86 which are readable via the data modules 88 and/or 90.

Figure 5:
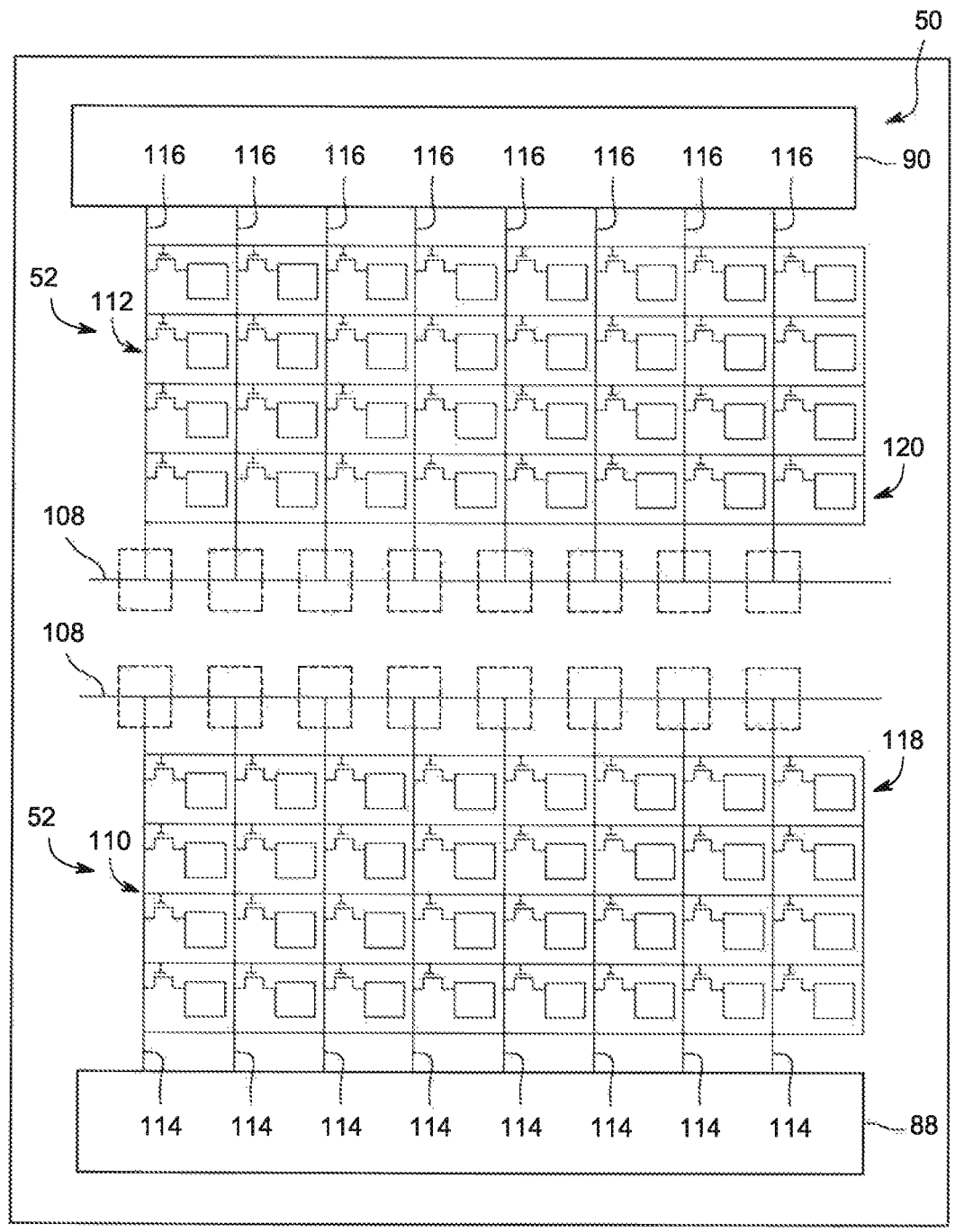
FIG. 5 is a diagram of another arrangement of the system of FIG. 4, in accordance with an embodiment of the present invention.

Referring now to FIG. 5, the detector elements 52 may be arranged into two or more sets 110 and 112. For example, in an embodiment, the detector elements 52 may be arranged into a first 110 set and a second 112 set, each of the detector elements 52 in the first 110 and second 112 sets electronically connected to a first 88 and a second data module 90 via a first 114 and a second 116 set of data lines, respectively. As will be appreciated, dividing the reading of the detector elements 52 between two or more data modules 88, 90, reduces the time needed to read the entire array 50. In such embodiments, the controller 22 may test the detector elements 52 in the middle rows 118, 120 of the array 50 simultaneously, e.g., data module 88 reads the detector elements 52 in row 118 while data module 90 reads the detector elements 52 in row 120. In embodiments, the tested detector elements 52 may be simulated detector elements 108, e.g., wires that run between rows 118 and 120 and which provide for a voltage to be generated in the data lines 114 and 116.

Returning back to FIG. 1, in embodiments, upon determining that the reading 92 (FIG. 3) of a detector element 52 (FIG. 2) is zero (0), or any other value which may indicate a break in the data lines 80, 82, 84, 86 (FIG. 2), or other problem with the components of the radiation detector 20, the system 96 (FIG. 2) may generate an indicator 126 that provides notice to a user/operator of the radiation detector 20 that the integrity of the radiation detector 20 is compromised. The indicator 126 may be an audio and/or visual signal, e.g., a sounding alarm, a light, an on screen message, etc. In embodiments, the indicator 126 may be an electronic message, e.g., e-mail, text message, etc., sent to a manufacturer and/or repair facility via the Internet and/or other similar communications network. In such embodiments, the indicator 126 may contain a detailed analysis of the suspected issues which caused the controller 22 to deem the integrity of the radiation detector 20 as being compromised, e.g., the number and/or identification of suspected broken data lines 80, 82, 84, 86.

Additionally, in embodiments, the controller 22 may prevent the radiation detector 20 and/or corresponding imaging system 10 from operating in the event that the controller 22 determines that the integrity of the radiation detector 20 is compromised.

Further, by changing the base voltage level of the detector elements of a radiation detector such that, under normal operating conditions, the base voltage level is a non-zero value, some embodiments of the present invention provide for the detection of broken data lines and/or other failed components of the radiation detector by sensing a data line value of zero (0) and/or near zero (0) volts.

Finally, it is also to be understood that the systems 10 and/or 96 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, as previously mentioned, the system 10 and/or 96 may include at least one processor and system memory/data storage structures, which may include random access memory (RAM) and read-only memory (ROM). The at least one processor of the systems 10 and/or 96 may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that adapts the controller to perform the methods disclosed herein may be read into a main memory of the at least one processor from a computer-readable medium. The term "computer-readable medium," as used herein, refers to any medium that provides or participates in providing instructions to the at least one processor of the systems 10 and/or 96 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes at least one processor to perform the methods/processes described herein, hard-wired circuitry may be used in place of, or in combination with, software instructions for implementation of the methods/processes of the present invention. Therefore, embodiments of the present invention are not limited to any specific combination of hardware and/or software.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, a system for verifying the integrity of a radiation detector is provided. the system includes one or more data modules, one or more data lines, and a controller. The one or more data lines electronically connect one or more detector elements of the radiation detector to the one or more data modules. Each of the detector elements is operative to detect electromagnetic radiation. The controller is operative to induce a voltage in the one or more detector elements, obtain a reading from the one or more detector elements via the one or more data modules; and determine whether the integrity of the radiation detector has been compromised based at least in part on comparing the reading to a benchmark. In certain embodiments, the controller is further operative to change a voltage level of the one or more detector elements. In certain embodiments, the benchmark corresponds to a threshold beyond a base voltage level of the one or more detector elements. In certain embodiments, a determination by the controller that the integrity of the radiation detector has been compromised indicates that a break exists in the one or more data lines. In certain embodiments, the system further includes a common line that electronically connects the one or more detector elements to one another. In such embodiments, the controller induces the voltage in the one or more detector elements via the common line. In certain embodiments, the one or more detector elements are disposed in a peripheral zone of an encompassing detector array. In certain embodiments, the one or more detector elements are simulated detector elements of an encompassing detector array. In certain embodiments, the one or more detector elements are arranged into a first set of detector elements and a second set of detector elements. In such embodiments, each detector element of the first set electronically connected to a first data module of the one or more data modules via a first set of data lines of the one or more data lines, and each detector element of the second set electronically connected to a second data module of the one or more data modules via a second set of data lines of the one or more data lines. In such embodiments, the reading is obtained from at least one of the first data module and the second data module. In certain embodiments, the controller is further operative to generate an indicator that provides notice that the integrity of the radiation detector has been compromised. In certain embodiments, the electromagnetic rays are at least one of x-rays and gamma rays.

Other embodiments provide for a method for verifying the integrity of a radiation detector. The method includes inducing a voltage in one or more detector elements of the radiation detector, each of the detector elements operative to detect electromagnetic radiation. The method further includes obtaining a reading from the one or more detector elements, and determining whether the integrity of the radiation detector has been compromised based at least in part on comparing the reading to a benchmark. In certain embodiments, the method further includes changing a voltage level of the one or more detector elements. In certain embodiments, the benchmark corresponds to a threshold beyond a base voltage level of the one or more detector elements. In certain embodiments, the one or more detector elements are connected to one or more data modules via one or more data lines under normal operating conditions. In such embodiments, determining whether the integrity of the radiation detector has been compromised includes determining whether a break exists in the one or more data lines. In certain embodiments, inducing a voltage in one or more detector elements of the radiation detector is based at least in part on a common line that electronically connects the one or more detector elements to one another. In certain embodiments, the one or more detector elements are disposed within a peripheral zone of an encompassing detector array. In certain embodiments, the one or more detector elements are simulated detector elements of an encompassing detector array. In certain embodiments, the one or more detector elements are arranged into a first set of detector elements and a second set of detector elements. In such embodiments, each detector element of the first set is electronically connected to a first data module via a first set of data lines, and each detector element of the second set is electronically connected to a second data module via a second set of data lines. In such embodiments, the reading is obtained from at least one of the first data module and the second data module. In certain embodiments, the method further includes preventing operation of at least one of the radiation detector and an imaging system that includes the radiation detector. In certain embodiments, the method further includes generating an indicator that provides notice that the integrity of the radiation detector has been compromised.

Yet still other embodiments provide for a non-transitory computer readable medium storing instructions. The stored instructions are configured to adapt a controller to induce a voltage in one or more detector elements of a radiation detector, obtain a reading from the one or more detector elements via one or more data modules electrically connected to the one or more detector elements via one or more data lines, and determine whether the integrity of the radiation detector has been compromised based at least in part on comparing the reading to a benchmark.

Accordingly, as will be appreciated, by testing the integrity of a radiation detector by inducing voltages in the detector elements of the radiation detector, or by inducing voltages directly on the data lines of the radiation detector, some embodiments of the invention provide for the ability to determine if the integrity of the radiation detector has been compromised without incorporating an accelerometer into the radiation detector. Thus, some embodiments of the present reduce the costs associated with manufacturing a radiation detector and/or the size of the radiation detector.

Further, by directly testing data lines, as opposed to traditional systems which rely on accelerometers, some embodiments of the present invention reduce, and/or eliminate, the number of false positives and/or false negatives as compared to such traditional systems. Thus, some embodiments of the present invention decrease the amount of down time of a radiation detector due to false positives, and/or reduce the amount of excessive radiation exposure to a patient resulting from having to reacquire medical images due to a compromised radiation detector.

Additionally, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted as such, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A system for verifying a functional integrity of a radiation detector comprising:
   one or more data modules;
   one or more data lines that electronically connect one or more detector elements of the radiation detector to the one or more data modules, each of the detector elements operative to detect electromagnetic radiation; and
   a controller operative to:
      induce a voltage in the one or more detector elements, wherein the induced voltage simulates detection of an optical photon;
      obtain a reading from the one or more detector elements via the one or more data modules; and
      determine whether the functional integrity of the radiation detector has been compromised based at least in part on comparing the reading to a benchmark.

2. The system of claim 1, wherein the controller is further operative to:
   change a voltage level of the one or more detector elements.

3. The system of claim 1, wherein the benchmark corresponds to a threshold beyond a base voltage level of the one or more detector elements.

4. The system of claim 1, wherein a determination by the controller that the functional integrity of the radiation detector has been compromised indicates that a break exists in the one or more data lines.

5. The system of claim 1 further comprising: a common line that electronically connects the one or more detector elements to one another; and wherein the controller induces the voltage in the one or more detector elements via the common line.

6. The system of claim 1, wherein the one or more detector elements are disposed in a peripheral zone of an encompassing detector array.

7. The system of claim 1, wherein the one or more detector elements are simulated detector elements of an encompassing detector array.

8. The system of claim 1, wherein the one or more detector elements are arranged into a first set of detector elements and a second set of detector elements, each detector element of the first set electronically connected to a first data module of the one or more data modules via a first set of data lines of the one or more data lines, and each detector element of the second set electronically connected to a second data module of the one or more data modules via a second set of data lines of the one or more data lines; and the reading is obtained from at least one of the first data module and the second data module.

9. The system of claim 1, wherein the controller is further operative to: generate an indicator that provides notice that the functional integrity of the radiation detector has been compromised.

10. The system of claim 1, wherein the electromagnetic rays are at least one of x-rays and gamma rays.

11. A method for verifying a functional integrity of a radiation detector comprising:
    inducing a voltage in one or more detector elements of the radiation detector, each of the detector elements operative to detect electromagnetic radiation, wherein the induced voltage simulates detection of an optical photon;
    obtaining a reading from the one or more detector elements; and
       determining whether the functional integrity of the radiation detector has been compromised based at least in part on comparing the reading to a benchmark.

12. The method of claim 11 further comprising: changing a voltage level of the one or more detector elements.

13. The method of claim 11, wherein the benchmark corresponds to a threshold beyond a base voltage level of the one or more detector elements.

14. The method of claim 11, wherein the one or more detector elements are connected to one or more data modules via one or more data lines under normal operating conditions, and determining whether the functional integrity of the radiation detector has been compromised comprises: determining whether a break exists in the one or more data lines.

15. The method of claim 11, wherein inducing a voltage in one or more detector elements of the radiation detector is based at least in part on a common line that electronically connects the one or more detector elements to one another.

16. The method of claim 11, wherein the one or more detector elements are disposed within a peripheral zone of an encompassing detector array.

17. The method of claim 11, wherein the one or more detector elements are simulated detector elements of an encompassing detector array.

18. The method of claim 11 further comprising: generating an indicator that provides notice that the functional integrity of the radiation detector has been compromised.

19. The method of claim 11 further comprising: preventing operation of at least one of the radiation detector and an imaging system that includes the radiation detector.

20. A non-transitory computer readable medium storing instructions configured to adapt a controller to:
    induce a voltage in one or more detector elements of a radiation detector, wherein the induced voltage simulates detection of an optical photon;

obtain a reading from the one or more detector elements via one or more data modules electrically connected to the one or more detector elements via one or more data lines; and determine whether a functional integrity of the radiation detector has been compromised based at least in part on comparing the reading to a benchmark.

\* \* \* \* \*